(12) United States Patent  (10) Patent No.: US 8,986,767 B2
Batchelder  (45) Date of Patent: Mar. 24, 2015

(54) ADDITIVE MANUFACTURING SYSTEM AND METHOD WITH INTERCHANGEABLE CARTRIDGES FOR PRINTING CUSTOMIZED CHOCOLATE CONFECTIONS

(75) Inventor: J. Samuel Batchelder, Somers, NY (US)

(73) Assignee: Stratsys, Inc., Eden Prairie, MN (US)

( * ) Notice: Subject to any disclaimer, the term of this patent is extended or adjusted under 35 U.S.C. 154(b) by 154 days.

(21) Appl. No.: 13/432,431

(22) Filed: Mar. 28, 2012

(65) Prior Publication Data

US 2012/0251689 A1  Oct. 4, 2012

Related U.S. Application Data

(60) Provisional application No. 61/469,291, filed on Mar. 30, 2011.

(51) Int. Cl.
| | |
|---|---|
| *A23G 1/20* | (2006.01) |
| *A23G 1/00* | (2006.01) |
| *A23G 3/34* | (2006.01) |
| *A23G 3/02* | (2006.01) |
| *A23P 1/08* | (2006.01) |

(52) U.S. Cl.
CPC ............ *A23G 3/0097* (2013.01); *A23G 1/0056* (2013.01); *A23G 1/202* (2013.01); *A23G 3/0242* (2013.01); *A23P 2001/089* (2013.01)
USPC .......................................... 426/516; 426/520

(58) Field of Classification Search
USPC ................. 426/383, 512, 516, 520, 306, 104; 99/353; 222/146.5
See application file for complete search history.

(56) References Cited

U.S. PATENT DOCUMENTS

| | | | | |
|---|---|---|---|---|
| 2,784,096 | A | * | 3/1957 | Ciccone ......................... 426/474 |
| 3,533,374 | A | * | 10/1970 | Luescher ........................ 118/20 |
| 3,921,858 | A | * | 11/1975 | Bemm ....................... 222/146.5 |
| 5,121,329 | A | | 6/1992 | Crump .......................... 364/468 |
| 5,303,141 | A | | 4/1994 | Batchelder et al. ........... 364/149 |
| 5,312,224 | A | | 5/1994 | Batchelder et al. ............. 415/73 |
| 5,340,433 | A | | 8/1994 | Crump .......................... 156/578 |
| 5,480,664 | A | * | 1/1996 | Ferrero ......................... 426/307 |
| 5,503,785 | A | | 4/1996 | Crump et al. ................ 264/40.7 |
| 5,514,390 | A | | 5/1996 | Aasted .......................... 426/231 |
| 5,525,364 | A | | 6/1996 | Haslund ....................... 426/231 |
| 5,764,521 | A | | 6/1998 | Batchelder et al. ...... 364/475.01 |
| 5,850,782 | A | | 12/1998 | Aasted ............................ 99/455 |
| 5,881,923 | A | * | 3/1999 | Bokros ...................... 222/146.5 |

(Continued)

FOREIGN PATENT DOCUMENTS

| | | |
|---|---|---|
| CH | 635986 A5 | 5/1983 |
| DE | 1956057 A1 | 1/1971 |

(Continued)

OTHER PUBLICATIONS

International Search Report and Written Opinion dated Mar. 28, 2012 from International Patent Application No. PCT/US2012/030841.

*Primary Examiner* — Steven Leff
(74) *Attorney, Agent, or Firm* — Brian R. Morrison; Westman, Champlin & Koehler, P.A.

(57) ABSTRACT

An additive manufacturing system for printing a chocolate confection, the system comprising a platen, a print head, and a cartridge configured to be removably secured to the print head, wherein the cartridge contains a supply of the chocolate material.

17 Claims, 7 Drawing Sheets

(56) References Cited

U.S. PATENT DOCUMENTS

| | | | | |
|---|---|---|---|---|
| 5,939,008 | A | 8/1999 | Comb et al. | 264/308 |
| 6,003,733 | A * | 12/1999 | Wheeler | 222/146.5 |
| 6,004,124 | A | 12/1999 | Swanson et al. | 425/375 |
| 6,022,207 | A | 2/2000 | Dahlin et al. | 425/145 |
| 6,051,267 | A * | 4/2000 | Jury et al. | 426/516 |
| 6,054,077 | A | 4/2000 | Comb et al. | 264/40.7 |
| 6,065,395 | A | 5/2000 | Sollich | 99/470 |
| 6,067,480 | A | 5/2000 | Stuffle et al. | 700/109 |
| 6,085,957 | A | 7/2000 | Zinniel et al. | 226/8 |
| RE36,937 | E * | 10/2000 | Mackley | 426/516 |
| 6,238,613 | B1 | 5/2001 | Batchelder et al. | 264/404 |
| 6,547,995 | B1 | 4/2003 | Comb | 264/40.1 |
| 6,685,866 | B2 | 2/2004 | Swanson et al. | 264/308 |
| 6,749,414 | B1 | 6/2004 | Hanson et al. | 425/130 |
| 6,814,907 | B1 | 11/2004 | Comb | 264/40.07 |
| 6,860,788 | B2 * | 3/2005 | Small et al. | 446/475 |
| 6,998,087 | B1 | 2/2006 | Hanson et al. | 264/308 |
| 7,891,964 | B2 | 2/2011 | Skubic et al. | 425/375 |
| 8,556,392 | B2 | 10/2013 | de Grood et al. | |
| 2003/0232113 | A1 * | 12/2003 | Refer | 426/306 |
| 2004/0130593 | A1 | 7/2004 | Decorte | |
| 2006/0127548 | A1 * | 6/2006 | Nakanishi | 426/383 |
| 2007/0231427 | A1 | 10/2007 | Ream | 426/5 |
| 2008/0260918 | A1 | 10/2008 | Lai et al. | 426/231 |
| 2009/0317528 | A1 * | 12/2009 | Abylov et al. | 426/519 |
| 2011/0074065 | A1 | 3/2011 | Batchelder et al. | 264/308 |
| 2011/0076496 | A1 | 3/2011 | Batchelder et al. | 428/373 |
| 2011/0121016 | A1 | 5/2011 | de Grood et al. | |
| 2012/0251688 | A1 * | 10/2012 | Zimmerman et al. | 426/383 |
| 2012/0285943 | A1 * | 11/2012 | Guerrero | 219/227 |

FOREIGN PATENT DOCUMENTS

| | | |
|---|---|---|
| GB | 686565 | 1/1953 |
| GB | 2334196 A | 8/1999 |

* cited by examiner

ADDITIVE MANUFACTURING SYSTEM AND METHOD WITH INTERCHANGEABLE CARTRIDGES FOR PRINTING CUSTOMIZED CHOCOLATE CONFECTIONS

CROSS-REFERENCE TO RELATED APPLICATION(S)

This application claims priority to U.S. Provisional Patent Application No. 61/469,291, filed on Mar. 30, 2011, and entitled "ADDITIVE MANUFACTURING SYSTEM AND METHOD WITH INTERCHANGEABLE CARTRIDGES FOR PRINTING CUSTOMIZED CHOCOLATE CONFECTIONS".

BACKGROUND

The present disclosure relates to additive manufacturing systems and methods for building three-dimensional (3D) objects with layer-based, additive manufacturing techniques. In particular, the present disclosure relates to layer-based, additive manufacturing systems for printing edible chocolate confections.

An additive manufacturing process is used to build 3D objects in a layer-by-layer manner. For example, an additive manufacturing process developed by Stratasys, Inc. prints a 3D object from a digital representation of the 3D object in a layer-by-layer manner by extruding a flowable modeling material. The modeling material is extruded through an extrusion tip carried by an extrusion head, and is deposited as a sequence of roads on a substrate in an x-y plane. The extruded modeling material fuses to previously deposited modeling material, and solidifies upon a drop in temperature. The position of the extrusion head relative to the substrate is then incremented along a z-axis (perpendicular to the x-y plane), and the process is then repeated to form a 3D object resembling the digital representation.

The modeling materials for use in these extrusion-based 3D printers are typically amorphous thermoplastic materials. As such, the resulting 3D objects may be fabricated from the industrial-quality, thermoplastic materials that provide good part strengths and chemical resistances to the 3D parts. However, the application of edible materials in the field of additive manufacturing would allow commercial vendors and consumers to effectively print edible 3D objects. This may expand the field of additive manufacturing to commercial and consumer markets that have previously been overlooked. For example, chocolate has an interesting place in the minds of consumers, and is a luxury that has become one of the most popular holiday gifts. For example, molded chocolate shapes have become holiday traditions (e.g., chocolate hearts, eggs, and bunnies). As such, there is an ongoing need for systems and techniques for creating intricate and customized shapes from edible materials, such as chocolate materials.

SUMMARY

An aspect of the present disclosure is directed to an additive manufacturing system for printing a chocolate confection. The additive manufacturing system includes at least one controller configured to receive instructions for printing the chocolate confection, and further configured to relay commands relating to the received instructions. The system also a platen and a print head, where at least one of the platen and the print head is movable such that the platen and the print head move relative to each other based on commands from the controller. The system further includes a cartridge configured to be removably secured to the print head, where the cartridge contains a supply of the chocolate material, and where the print head is configured to extrude the chocolate material onto the platen to build the three-dimensional part using a layer-based, additive manufacturing technique in a duration that prevents the chocolate material from thickening past a viscosity threshold of the chocolate material.

Another aspect of the present disclosure is directed to a cartridge configured to be removably secured to a print head of an additive manufacturing system. The cartridge includes a compressible tube configured to contain a supply of a chocolate material, where the compressible tube has opposing major surfaces. The cartridge also includes an extrusion tip secured to the compressible tube, a first thermally-conductive plate disposed against a first of the opposing major surfaces of the compressible tube, and a second thermally-conductive plate disposed against a second of the opposing major surfaces of the compressible tube. The first and second thermally-conductive plates are configured to transfer thermal energy to the chocolate material in the compressible tube to heat the chocolate material to an extrudate state, where the compressible tube is configured to collapse under an application of external pressure to extrude the heated chocolate material from the extrusion tip.

Another aspect of the present disclosure is directed to a method for printing a chocolate confection. The method includes installing a cartridge to a print head of an additive manufacturing system, where the cartridge comprises a compressible reservoir containing a supply of a chocolate material. The method also includes heating the supply of the chocolate material in the installed cartridge to an extrudable state, and compressing the compressible reservoir in a direction along a vertical axis to extrude the heated chocolate material from the installed cartridge onto a platen of the additive manufacturing system to build at least a portion of the chocolate confection using a layer-based, additive manufacturing technique. All usable amounts of the chocolate material are desirably extruded from the cartridge prior to the chocolate material thickening past a viscosity threshold of the chocolate material.

DETAILED DESCRIPTION

The present disclosure is directed to an additive manufacturing system and method for printing customized chocolate confections. The system includes interchangeable cartridges, where each cartridge is configured to provide a measured quantity of the chocolate material. As discussed below, the quantity of the chocolate material in each head cartridge is desirably low enough to prevent the chocolate material from residing in the system for extended durations, which can otherwise result in undesired viscosity increases. As such, the additive manufacturing system precludes the need for a re-tempering process.

As used herein, the term "chocolate confection" refers to a three-dimensional object having a composition derived from a chocolate material. The term "chocolate material" refers to a material that includes chocolate such as sweet chocolate (e.g., milk chocolate), dark chocolate, white chocolate, baking chocolate, and the like. As discussed below, in some embodiments, the chocolate material may also include one or more additional additives. Chocolate is a complex organic compound that is temperature sensitive, has multiple stable crystalline phases, is a non-Newtonian fluid when in a liquid form, and thickens over time. Chocolate is produced from seeds of the cacao tree, which are fermented, dried, cleaned, and roasted to produce cacao nibs. The cacao nibs are ground to cocoa mass, which is then typically liquefied and formed into chocolate liquor. The chocolate liquor may then be processed into cocoa solids and cocoa butter.

The resulting chocolate may then be further processed to the desired form. For example, baking chocolate contains primarily includes cocoa solids and cocoa butter. Dark chocolate and sweet chocolate are similar to baking chocolate, and also include sugar, and optionally, additional fats. Milk chocolate is a form of sweet chocolate that also includes milk (e.g., powdered milk and/or condensed milk). White chocolate on the other hand, includes cocoa butter, sugar, and milk (e.g., powdered milk and/or condensed milk), but does not include cocoa solids.

As mentioned above, chocolate has multiple stable crystalline phases. This is primarily due to the cocoa butter, which is polymorphic and crystallizes into several different forms depending how the liquid cocoa butter solidifies. The polymorphic nature of the cocoa butter is believed to be the result of the different glycerides present in the cocoa butter. Table 1 lists the six different crystalline phases that cocoa butter can form, along with the respective melting temperatures and physical characteristics.

TABLE 1

| Crystal Phase | Melting Temperature | Physical Characteristics |
| --- | --- | --- |
| I | 17° C. (63° F.) | Soft, crumbly, melts too easily. |
| II | 21° C. (70° F.) | Soft, crumbly, melts too easily. |
| III | 26° C. (78° F.) | Firm, poor snap, melts too easily. |
| IV | 28° C. (82° F.) | Firm, poor snap, melts too easily. |
| V | 34° C. (94° F.) | Glossy, firm, best snap, melts near body temperature (37° C.). |
| VI | 36° C. (97° F.) | Hard, takes weeks to form. |

Stability increases from phase I to phase VI, with phase V crystal chocolate (also referred to as β form) being the most desirable for use as commercial chocolate. As shown in Table 1, phase V crystal chocolate has the most desirable melting temperature and aesthetic properties, and is also the most palatable. The cocoa butter in chocolate is crystallized to phase V by a tempering process, in which the chocolate is heated and cooled to specific temperatures under carefully controlled conditions. Nearly all commercially produced edible chocolate is phase V crystal chocolate. The other crystal phases result in less desirable chocolate, such as chocolate that is unpalatable, too soft, and/or that exhibits blooming effects.

For example, fat bloom is believed to be based on either phase separation or polymorphism. Under phase separation, it is believed that the separation of triglycerides within the cocoa butter crystalline structure causes the fat bloom. Since cocoa butter is made of a diverse mix of triglycerides, each with its own unique melting point, some triglycerides may still be liquid at higher temperatures. These liquid triglycerides are forced to the surface of the chocolate and solidify in a stable form, thereby resulting in the blooming effect.

Under polymorphism, the fat bloom formation is believed to be related to the polymorphism of the cocoa butter. In particular, the blooming effects are believed to occur when lower melting forms of crystals transition to the most stable phase VI crystals. This typically occurs with the transition from phase IV to phase V crystals, although the transition from phase V to phase VI crystals also has the potential to produce blooming effects.

Regardless of the particular mechanism, the resulting fat bloom results in chalky appearances on the surface of the chocolate part. While such chocolate parts are still safe to eat, the chalky appearances reduce the aesthetic qualities of the chocolate parts, and may also potentially reduce the palatability of the resulting chocolate. As discussed below, the additive manufacturing system of the present disclosure is suitable for forming chocolate confections for consumer use and consumption that have minimal or no blooming effects. In particular, the system provides a thermal profile that maintains the temper of the chocolate material, thereby allowing the chocolate confections printed with the system to have phase V crystal chocolate.

Figure 1:
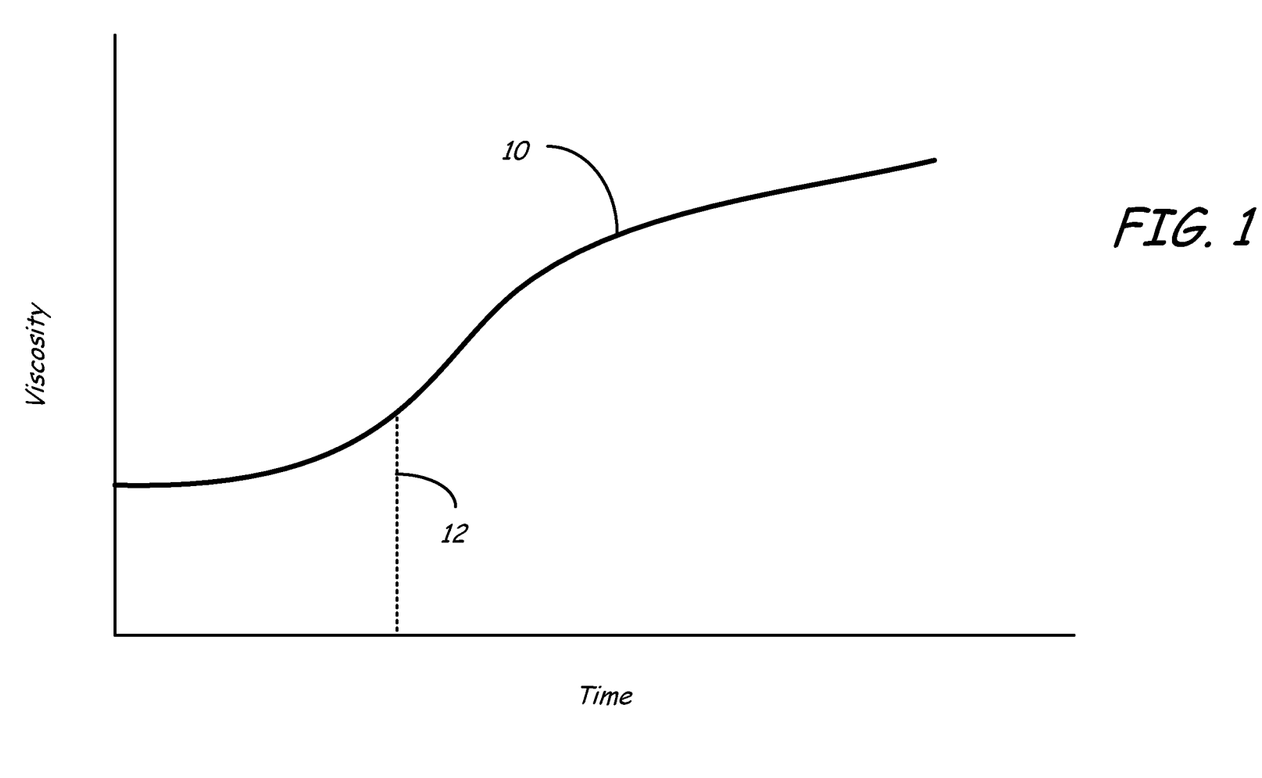
FIG. 1 is a plot of viscosity of chocolate over time while the chocolate is sheared at a constant shear rate and while being maintained at a suitable tempering temperature, which illustrates the thickening properties of chocolate over time.

While proper tempering to phase V crystal chocolate is suitable for minimizing or preventing blooming effects, chocolate also thickens exponentially over time at a constant shear rate and temperature (i.e., the viscosity increases over time). This provides another engineering challenge to printing chocolate confections in an additive manufacturing system. For example, FIG. 1 shows plot 10 of the viscosity of chocolate over time while being sheared at a constant shear rate (e.g., 1.0 seconds$^{-1}$) and while being maintained at a suitable tempering temperature (e.g., 86° F. to 88° F.). As shown, as a continuous shear is applied to the chocolate, the viscosity of the chocolate increases exponentially over time, as indicated by the increased slope of plot 10. This exponential increase in viscosity of the sheared chocolate is believed to be due to the crystallization of the cocoa butter into the phase V crystal form.

The particular viscosities and slopes of plot 10 may vary depending on the chocolate composition, the holding temperature, and the shear rate used. For example, since chocolate is a non-Newtonian fluid when melted, chocolate reduces in viscosity with an increase in applied shear rates. Thus, the baseline viscosities may be reduced by increasing the applied shear rate. However, for any constant shear rate and temperature, the chocolate will eventually thicken enough to no longer be extrudable in an additive manufacturing process. This point is indicated by viscosity threshold 12 in FIG. 1.

For suitable shear rates and temperatures for tempering the chocolate to form phase V crystal chocolate, the chocolate will thicken to viscosity threshold 12 within about 50 to about 60 minutes. In comparison, the time required to print a chocolate confection may exceed this time period. As discussed below, the additive manufacturing system includes interchangeable head cartridges that limit the duration that the chocolate material resides in the system, such that the chocolate material is consumed prior to reaching the viscosity threshold.

Figure 2:
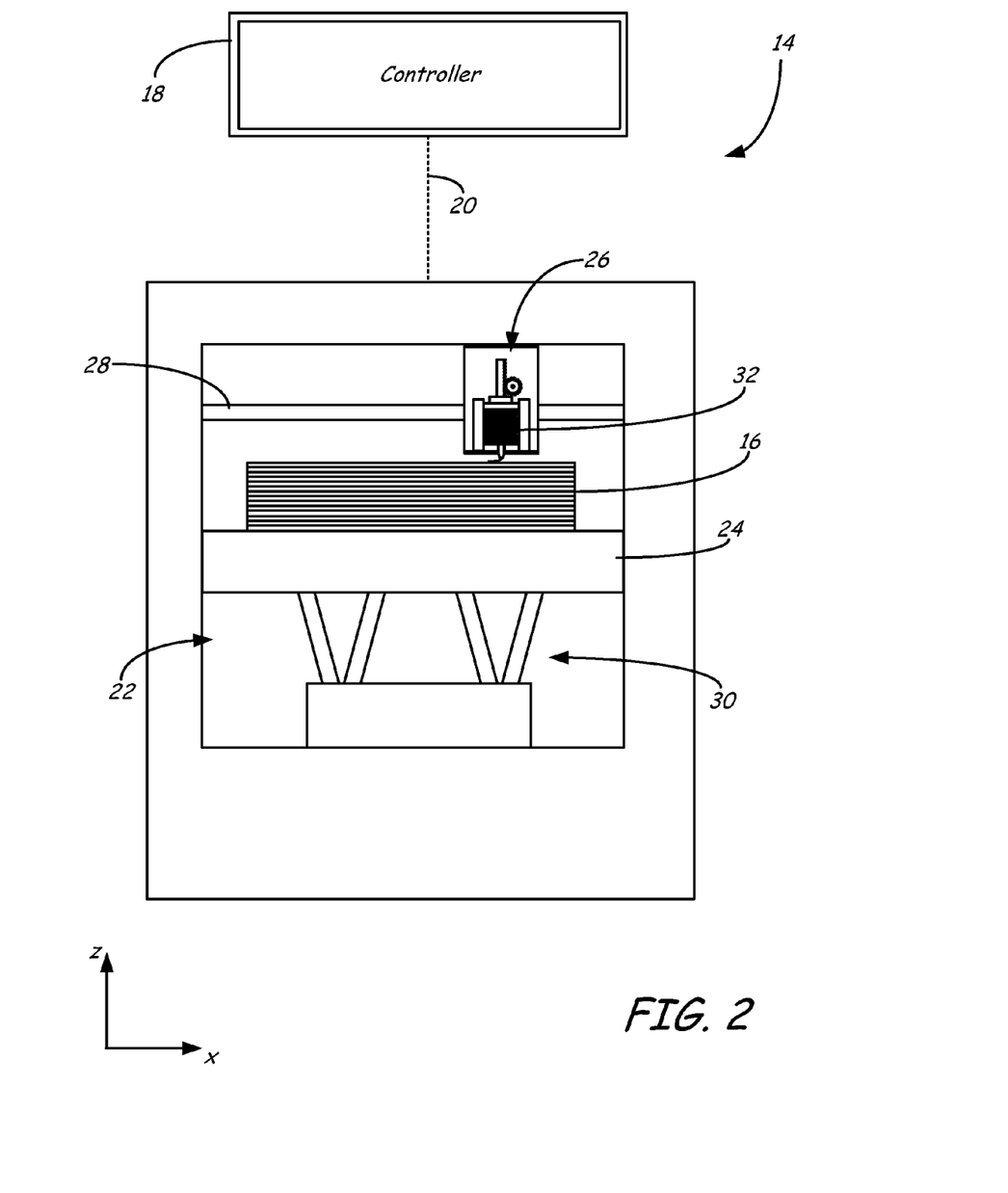
FIG. 2 is a schematic illustration of an additive manufacturing system of the present disclosure, which includes a print head for use with interchangeable cartridges of chocolate material.

FIG. 2 is a schematic illustration of system 14, where system 14 is an example of a suitable additive manufacturing system of the present disclosure. System 14 is configured to print custom-designed chocolate confections (e.g., confection 16) in a layer-by-layer manner from a tempered chocolate material, where the chocolate material is provided in interchangeable cartridges.

As shown, system 14 includes controller 18, signal communication line 20, build chamber 22, platen 24, print head 26, x-y gantry 28, and platen gantry 30. Controller 18 is one or more computer-based controllers for operating system 14 over signal communication line 20. Signal communication line is one or more physical wire connections and/or wireless connections that interconnect the components of system 14 with controller 18. Accordingly, controller 18 may monitor and direct the operation of the components of system 14 with the use of sensors (e.g., thermocouples) and process control loops. In particular, controller 18 may receive instructions for printing chocolate confections (e.g., confection 16), and send commands to one or more components of system 14 (e.g., to print head 26) relating to the received instructions.

Build chamber 22 is an enclosable environment in which the chocolate confections may be printed. The environment of build chamber 22 may be maintained at ambient conditions (e.g., room temperature) or may be heated or cooled to one or more controlled temperatures (e.g., 70° F.). The use of controlled temperatures in build chamber 22 may be suitable to assist in maintaining the temper of the chocolate material, and may reduce distortions and curling of confection 16. The environment in build chamber 22 may be controlled in a variety of manners (e.g., with heated or refrigerated circulating air, heat lamps, and the like). In alternative embodiments, build chamber 22 may be omitted or open to atmospheric conditions.

Platen 24 is a platform on which confection 16 is printed, and is supported by platen gantry 30. Print head 26 is an extrusion head configured to extrude the chocolate material onto platen 24 to print chocolate confections (e.g., confection 16) in a layer-by-layer manner. Print head 26 is supported by x-y gantry 28, which is a guide-rail, gantry mechanism configured to move print head 26 in the horizontal x-y plane above platen 24.

In order to print custom-designed chocolates (e.g., confection 16), platen 24 and print head 26 are moveable relative to each other based on signals from controller 18. In particular, platen 24 may be moved with use of platen gantry 30, and print head 26 may be moved with the use of x-y gantry 28.

In one embodiment, platen gantry 30 may move platen 24 along the vertical z-axis, and x-y gantry 28 may move print head 26 in the horizontal x-y plane. The horizontal x-y plane is a plane defined by an x-axis and a y-axis, where the x-axis, the y-axis, and the z-axis are orthogonal to each other. This is a typical design arrangement for the fused deposition modeling systems developed by Stratasys, Inc., Eden Prairie, Minn.

In an alternative embodiment, print head 26 may be moved along the vertical z-axis, and platen 24 may be moved in the horizontal x-y plane.

In a further alternative embodiment, print head 26 may be immobile within system 14. In this embodiment, platen 24 is configured to move in multiple directions in the x-y-z coordinate system. In another alternative embodiment in which print head 26 is fixed within system 14, platen 24 may be configured to move and pivot in multiple degrees of freedom (e.g., at least five degrees of freedom). As discussed below, this embodiment is beneficial for reducing or eliminating the need for support materials. Other combinations of the relative movements between platen 24 and print head 26 may also be incorporated into system 14.

Upon being extruded onto platen 24, the chocolate material used to print confection 16 may then slowly cool with the desired chocolate crystal phase. For phase V crystal chocolate, suitable cooling temperatures range from about 65° F. to about 75° F. (e.g., about 70° F.). In the shown embodiment, confection 16 may be printed in a layer-by-layer manner, where controller 18 directs print head 26 to move and deposit the chocolate material onto platen 24 along a series of tool paths for each layer. After being deposited, the chocolate material may slowly cool to a fully solidified state with phase V crystal chocolate. After being fully printed, confection 16 may then be cooled down to room temperature, and may undergo one or more additional post-printing processes (e.g., packaging).

As discussed below, print head 26 is configured to receive and retain interchangeable cartridges of the chocolate material, such as interchangeable cartridge 32. Each cartridge 32 includes a measured amount of the chocolate material that is desirably consumed prior to the chocolate material thickening to the point of viscosity threshold 12 (shown in FIG. 1).

Figure 3:
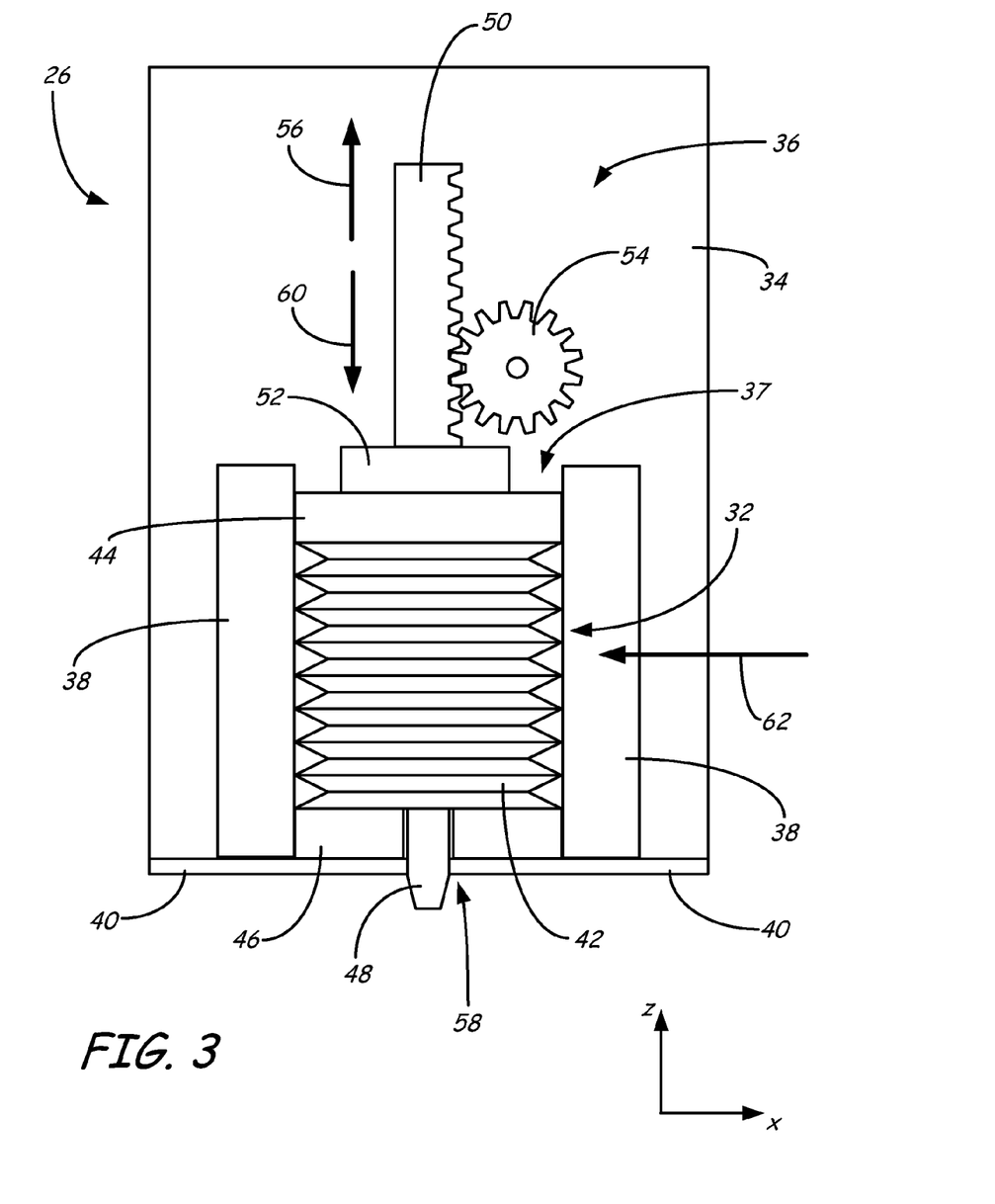
FIG. 3 is a schematic illustration of the print head of the additive manufacturing system in use with an interchangeable cartridge of chocolate material.

As shown in FIG. 3, print head 26 includes housing 34 and drive mechanism 36, and is configured to receive multiple, interchangeable cartridges 32. Housing 34 is a structural component of print head 26 and includes receptacle 37 defined at least in part by walls 38 and base surface 40 for retaining a given cartridge 32.

In the shown embodiment, cartridge 32 is a bellows-based assembly that includes bellows reservoir 42, upper barrier 44, lower barrier 46, and extrusion tip 48. Bellows reservoir 42 is a collapsible portion of cartridge 32 that is configured to retain a supply of a solid, pre-tempered, chocolate material (e.g., phase V crystal chocolate) for printing confection 516 (shown in FIG. 2). Bellows reservoir 42 may be fabricated from one or more metallic and/or polymeric materials with a collapsible, accordion-based design. Suitable dimensions for bellows reservoir 42 include an average diameter ranging from about 0.5 inches to about 1.5 inches, and a fully-extended length along the vertical z-axis ranging from about 2.0 inches to about 4.0 inches. These dimensions for bellows reservoir 42 provide a suitable amount of the chocolate material for use in system 14.

Upper barrier 44 and lower barrier 46 are rigid members secured to the opposing ends of bellows reservoir 42. Extrusion tip 48 is secured through an opening in lower barrier 46, thereby allowing the chocolate material to flow out of bellows reservoir through extrusion tip 48. To provide a sufficient flow resistance to avoid drippage, extrusion tip 48 may have an inner diameter ranging from about 0.008 inches to about 0.035 inches, and a length along the vertical z-axis ranging from about one times to about 20 times of the inner diameter.

During use, cartridge 32 may be installed into receptacle 37 and engaged with drive mechanism 670. In the shown example, drive mechanism 36 includes tracked shaft 50, face member 52, and drive wheel 54, where face member 52 is secured to a bottom end of tracked shaft 50. Tracked shaft 50 includes a series of tracks configured to engage with the teeth of drive wheel 54.

Accordingly, to install cartridge 32 to print head 26, controller 18 may direct drive wheel 54 to retract tracked shaft 50 and face member 52 upward (as represented by arrow 56) to a raised elevation. A user may then place and secure cartridge 32 within receptacle 37, such that extrusion tip 48 extends through opening 58 in base surface 40, and lower barrier 46 rests against base surface 40. The lateral dimensions of receptacle 37 desirably provide a secure lateral fitting for upper barrier 44 and lower barrier 46, thereby reducing the amount of shifting that cartridge experiences relative to print head 26 in the horizontal x-y plane.

After cartridge 32 is inserted into receptacle 37, controller 18 may direct drive wheel 54 to drive tracked shaft 50 and face member 52 downward (as represented by arrow 60) until face member 52 reaches upper barrier 44 of cartridge 32. The stopping point for face member 52 may be based on an increase in torque on the motor (not shown) operating drive wheel 54. This locks cartridge 32 into receptacle 37.

Controller 18 may then direct heated air to flow past bellows reservoir 42, as illustrated by arrow 62, to heat and melt the chocolate material retained in bellows reservoir 42. In alternative embodiments, different types of convective and/or conductive heating mechanisms may be used. For example, walls 38 of receptacle 37 may be heated to thermally conduct heat to bellows reservoir 42. The heating desirably maintains the temperature of the chocolate material below about 92° F. to allow the chocolate material to retains its temper.

The chocolate material is desirably heated for a suitable duration to bring the chocolate material to an extrudable state, while also maintaining the temper of the chocolate material. For example, if the chocolate material is initially provided at a temperature of 62° F. and heated air is blown across bellows reservoir 42 at a temperature of about 89° F., about seven thermal diffusion times are required for the core portion of the chocolate material in bellows reservoir 42 to reach 87° F. For a bellows reservoir 42 having a diameter (in the x-y plane) of 1.0 inch, the thermal diffusion time is about 3 minutes. As such, the heating duration is desirably about 20 minutes to allow the chocolate material to fully reach the extrudable state.

After the heating duration, controller 18 may then direct drive wheel 54 to rotate, thereby driving tracked shaft 50 and face member 52 downward in the direction of arrow 60. This compresses bellows reservoir 42 downward along the vertical z-axis, between upper barrier 44 and lower barrier 46, which extrudes the heated chocolate material out of extrusion tip 48 to print a portion of confection 16. Suitable pressures for extruding the chocolate material may vary depending on the dimensions of extrusion tip 48, and may range from about 2 psi to about 20 psi. Print head 26 may then continue to extrude the chocolate material to print successive layers of confection 16, based on the direction of controller 18.

As discussed above, bellows reservoir 42 desirably retains a suitable measured of the chocolate material to print small chocolate confections, or a portion of a larger chocolate confection. For example, print head 26 may deposit roads having heights of about 0.015 inches and widths of about 0.025 inches at a tool path speed of 2 inches/second. This calculates to about 2.2 cubic inches of chocolate material being extruded and deposited in a 50 minute period (i.e., before the chocolate material reaches viscosity threshold 12, shown in FIG. 1). When cartridge 32 depletes its supply of the chocolate material, the user of system 14 may remove the depleted cartridge 32 from print head 26 and interchange the depleted cartridge 32 with a new cartridge 32 for subsequent runs of small chocolate confections, or for continuing the printing of a larger shape (e.g., confection 16).

Figure 4:
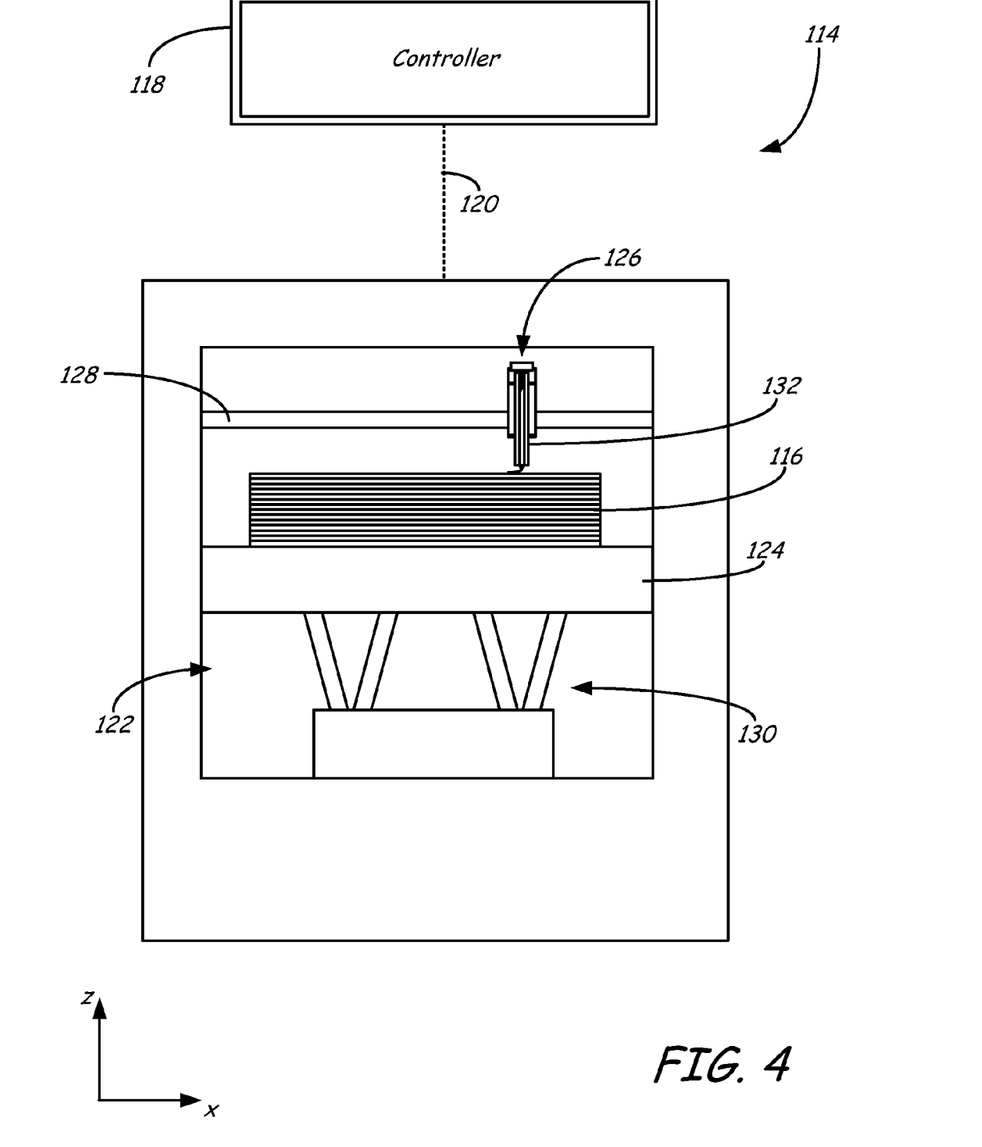
FIG. 4 is a schematic illustration of a first alternative additive manufacturing system of the present disclosure, which includes a first alternative print head for use with interchangeable cartridges of chocolate material.
Figure 5:
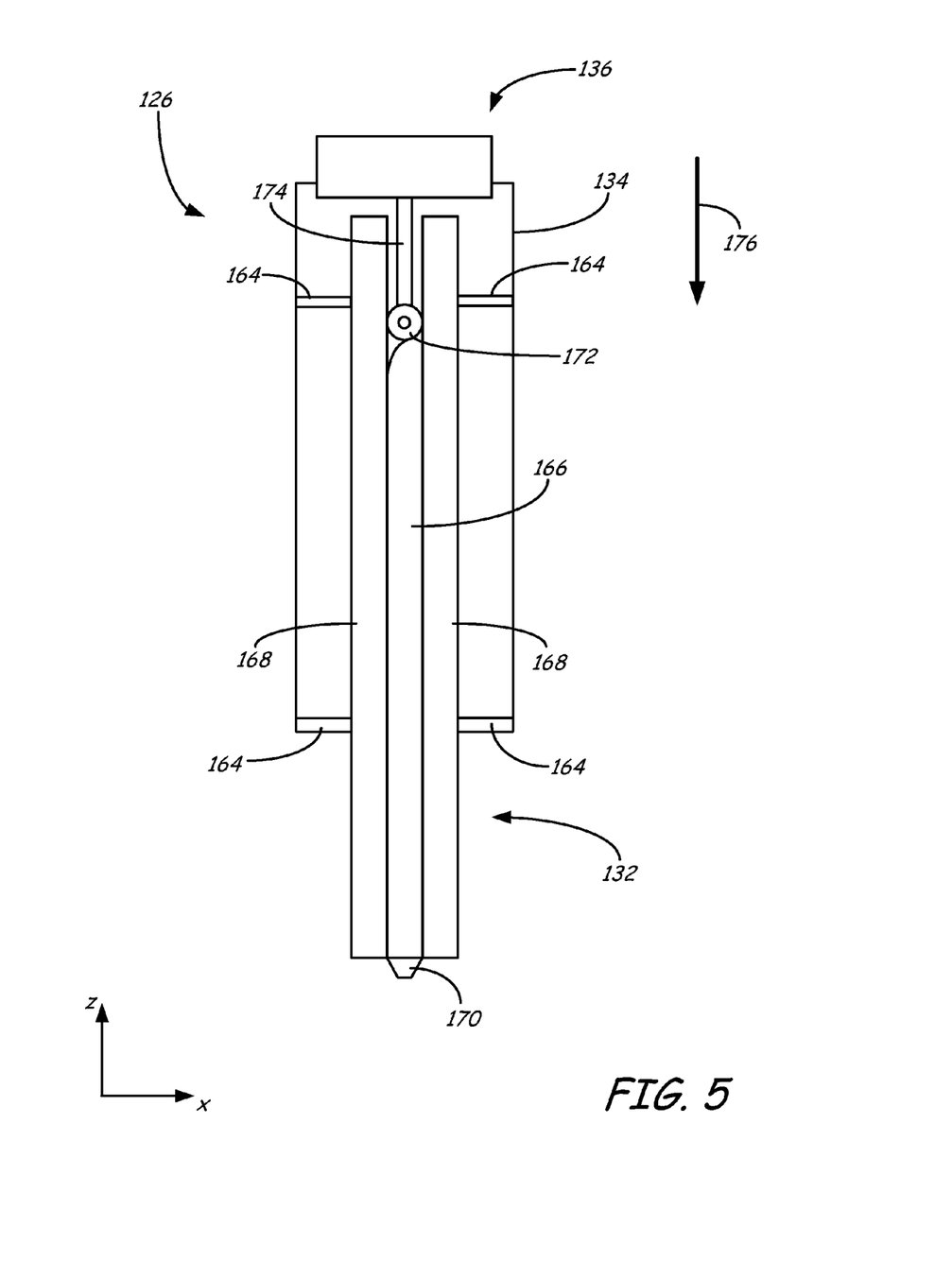
FIG. 5 is a schematic illustration of the first alternative print head of the additive manufacturing system in use with an interchangeable cartridge of chocolate material.

FIGS. 4 and 5 illustrate system 114, which is an alternative to system 14 for use with cartridge 132, and where corresponding reference labels are increased by "100" from those of system 14 (shown in FIGS. 2 and 3). As shown in FIG. 4, system 114 may operate in the same manner as system 14 for printing confection 116.

However, as illustrated in FIG. 5, print head 126 is configured to receive and retain cartridge 132, where cartridge 132 is a compressible reservoir configured to heat and melt the retained chocolate material at a faster rate than that attainable with cartridge 32. As shown, print head 126 includes housing 134 and drive mechanism 136, where housing 134 defines support brackets 164 for receiving and securely retaining cartridge 132.

Cartridge 132 is designed as a boxy version of a toothpaste tube, and includes tube 166 disposed between thermostatically-controlled plates 168, and with extrusion tip 170 extending from the bottom end of tube 166. Tube 166 is a rectangular tube-shaped, compressible reservoir configured to retain a supply of the pre-tempered chocolate material. As shown, tube 166 is secured between and in contact with plates 168, thereby allowing thermal energy to be conducted from plates 168 to tube 166 substantially in a one-dimensional thermal transfer. Cartridge 132 may also include one or more rigid supports to offset plates 168 from each other, and to retain tube 166 between plates 168. Alternatively, tube 166 may be secured to plates 168 (e.g., with an adhesive) to keep plates 168 secured against each major surface of tube 166.

Suitable dimensions for cartridge 132 may vary on the volume of the chocolate material used. For example, for providing about 2.2 cubic inches of the chocolate material, suitable dimensions for tube 166 include a length of about 6 inches, a width (in contact with plates 168) of about 2 inches, and a thickness of about 0.2 inches. This provides a thermal diffusion distance of about 0.1 inches, which provides rapid melting of the chocolate material, particularly compared to the bellows design of cartridge 32. Following the same example discussed above for cartridge 32, the heating duration for cartridge 132 only requires about 1.5 minutes to allow the chocolate material to fully reach the extrudable state. This is substantially faster than the heating duration required by cartridge 32, and may reduce the overall time required to print chocolate confections by reducing the time required to interchange each cartridge 132.

During use, cartridge 132 may be securely installed into support brackets 164, and controller 118 may direct drive mechanism 136 to engage with the top end of tube 166, between plates 168. In the shown embodiment, drive mechanism 136 includes roller 172 and plunger 174, where plunger 174 may be actuated upwards and downwards along the vertical z-axis, based on signals from controller 118. Roller 172 is a rotatable wheel disposed at the end of plunger 174, and is configured to compress successive portions of tube 166 based on the downward movement of plunger 174.

Plates 168 are also desirably connected to an electrical source on print head 126 to generate thermal energy. After cartridge 132 is installed to print head 126, controller 118 may direct plates 168 to heat tube 166, thereby melting the chocolate material retained in tube 166 to an extrudable state. The heating desirably maintains the temperature of the chocolate material below about 92° F. to allow the chocolate material to retains its temper, as discussed above for system 14.

After the initial heating, controller 18 may then direct roller 172 to rotate, and direct plunger 174 to move downward, as illustrated by arrow 176. This compresses successive portions of tube 166 downward along the vertical z-axis, which extrudes the heated chocolate material out of extrusion tip 170 to print a portion of confection 116. Print head 126 may then continue to extrude the chocolate material to print successive layers of confection 16, based on the direction of controller 118.

In addition to faster heating, the configuration of cartridge 132 provides greater extrusion control compared to cartridge 32. This is due in part to the use of plates 168, which prevent the compressed volume from expanding in any direction except through extrusion tip 170. When cartridge 132 depletes its supply of the chocolate material, the user of system 114 may then remove the depleted cartridge 132 from print head 126 and interchange the depleted cartridge 132 with a new cartridge 132 for subsequent runs of small chocolate confections, or for continuing the printing of a larger chocolate confection (e.g., confection 116).

Figure 6:
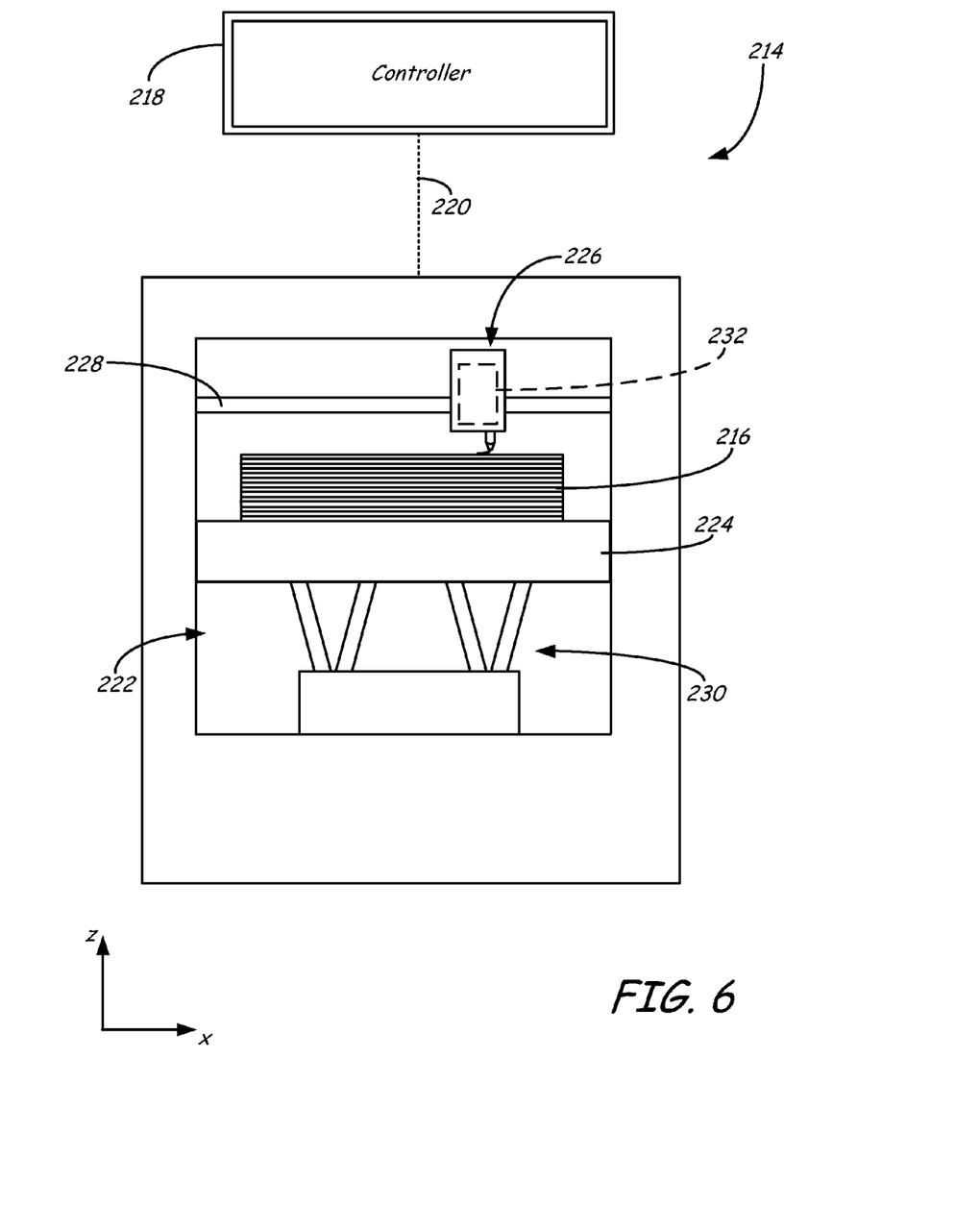
FIG. 6 is a schematic illustration of a second alternative additive manufacturing system of the present disclosure, which includes a second alternative print head for use with interchangeable cartridges of chocolate material.
Figure 7:
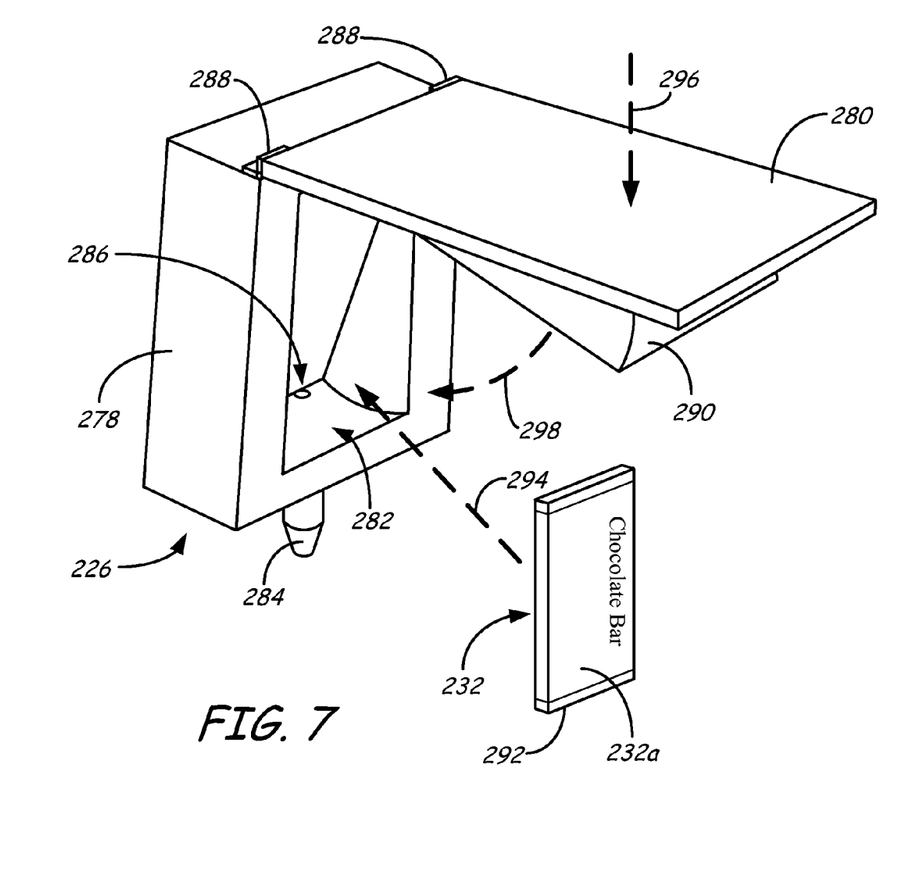
FIG. 7 is a schematic illustration of the second alternative print head of the additive manufacturing system in use with an interchangeable cartridge of chocolate material.

FIGS. 6 and 7 illustrate system 214, which is a second alternative to system 14 for use with cartridge 232 (shown with hidden lines in FIG. 6), and where corresponding reference labels are increased by "200" from those of system 14 (shown in FIGS. 2 and 3). As shown in FIG. 6, system 214 may operate in the same manner as system 14 for printing confection 216.

However, as illustrated in FIG. 7, print head 226 is configured to receive and retain cartridge 232, where cartridge 232 is a wrapped portion of a chocolate material. For example, in some embodiments, cartridge 232 is a commercially-available chocolate candy bar retained its wrapper (referred to as wrapper 232*a*). Alternatively, cartridge 232 may include a custom package.

As shown, print head 226 includes housing die 278 and mating tool 280, where housing die 278 defines cavity 282 for receiving cartridge 232. Housing die 278 also includes extrusion tip 284 and exit passage 286 interconnecting cavity 282 and extrusion tip 284. In the shown embodiment, mating tool 280 is pivotally connected to housing die 278 with hinge mechanisms 288. Mating tool 280 includes wedge block 290, which is desirably similar in dimensions to cavity 282, allowing wedge block 290 to insert within cavity 282.

During operation, a user may slit or puncture or unwrap one end of wrapper 232*a*, such as end 292. If cartridge 232 is a custom package, end 292 of wrapper 232*a* may include a low-adhesion flap that is openable under an applied pressure. The user may then insert cartridge 232 into cavity 282, as illustrated by arrow 294, such that end 292 faces downward, adjacent to exit passage 286 of housing die 278.

One or both of housing die 278 and mating tool 280 may be heated to melt the chocolate material of cartridge 232. After the initial heating, controller 218 may then direct a drive mechanism (not shown) of print head 226 to apply pressure to mating tool 280, as illustrated by arrow 296. This causes mating tool 280 to pivot around hinge mechanisms 288, as illustrated by arrow 298, allowing wedge block 290 to insert into cavity 282 and apply pressure to cartridge 232.

As discussed above for cartridge 132, the rectangular dimensions of cartridge 232 provides a small thermal diffusion distance, which provides rapid melting of the chocolate material, particularly compared to the bellows design of cartridge 32. As wedge block 290 is continuously pressed into cavity, the molten chocolate material is pressed out of wrapper 232*a* (e.g., through the slit, puncture, or flap), and through exit passage 286 and extrusion tip 284. The pressure applied to mating tool 280 directs the extrusion rate of the chocolate material through extrusion tip 284 to print a portion of confection 216.

Print head 226 may then continue to extrude the chocolate material to print successive layers of confection 216, based on the direction of controller 218. When cartridge 232 depletes its supply of the chocolate material, the user of system 214 may then remove the depleted cartridge 232 from print head 226 and interchange the depleted cartridge 232 with a new cartridge 232 for subsequent runs of small chocolate confections, or for continuing the printing of a larger chocolate confection (e.g., confection 216).

Figure 8:
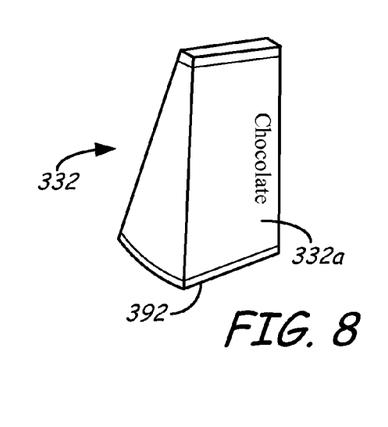
FIG. 8 is a schematic illustration of an alternative interchangeable cartridge of chocolate material for use with the second alternative print head.

In some embodiments, exit passage 286 may include a needle or ball valve to assist in the removal of trapped air in cavity 282. However, it is relative easy to maintain a constant pressure in the compressed volume of cavity 282, and relatively small motion of mating tool 280 will release the pressure. Furthermore, while cartridge 232 is illustrated with a rectangular geometry, in alternative embodiments, cartridge 232 may include different geometries. For example, as shown in FIG. 8, cartridge 332 may alternatively have a wedge-shaped geometry corresponding in dimensions to cavity 282. In this embodiment, the thin edge of the wedge-shaped geometry may be inserted at the top portion of cavity 282 (adjacent to hinge mechanisms 288) and the wider edge of the wedge-shaped geometry (at end 392) may be slit or otherwise punctured and positioned adjacent to the bottom portion of cavity 282 (adjacent to exit passage 286).

Cartridges 32, 132, and 232 are examples of particularly suitable interchangeable cartridges for use with the additive manufacturing systems of the present disclosure (e.g., systems 14, 114, and 214). Each interchangeable cartridge may be filled by pre-tempering the chocolate material and solidifying the chocolate material with dimensions compatible with the given cartridge. For example, the chocolate material may solidified into a slug, cylinder, or the like with dimensions that allow the chocolate material to be inserted into the given cartridge (e.g., within bellows reservoir 42, tube 166, or wrapper 232*a*). Multiple cartridges 32, 132, and 232 may then be used to print confections in systems 14, 114, and 214 where each supply of chocolate material is desirably consumed before the chocolate material thickens beyond its viscosity threshold (i.e., viscosity threshold 12).

Furthermore, systems 14, 114, and 214 desirably heat the chocolate materials to temperature(s) that retain the temper of the chocolate materials (e.g., no greater than 92° F.). This allows the resulting chocolate confections (e.g., confections 16, 116, and 216) to each be built in a layer-by-layer manner from the tempered chocolate material having the desired chocolate crystal phase (i.e., phase V crystal chocolate).

Part Materials

As discussed above, the chocolate material for printing chocolate confections includes chocolate, such as sweet chocolate (e.g., milk chocolate), dark chocolate, white chocolate, baking chocolate, and the like. The chocolate material desirably includes at least about 90% by weight, and more desirably at least about 95% by weight of chocolate, based on an entire weight of the chocolate material. In embodiments in which the chocolate material includes one or more additional additives, suitable additional additives include colorants, flavorants (e.g., mint, vanilla, coffee, cherry, strawberry, and/or orange flavorants), rheology modifiers, emulsifiers, surfactants, and the like. In one embodiment, the chocolate material consists essentially of chocolate (e.g., consists essentially of milk chocolate, dark chocolate, white chocolate, baking chocolate, and combinations thereof).

The chocolate in the chocolate material also desirably has small particles sizes. Examples of suitable average diameters for the chocolate range from about 5 micrometers to about 50 micrometers, with particularly suitable average diameters ranging from about 10 micrometers to about 20 micrometers.

While the additive manufacturing systems of the present disclosure have been described in use with a chocolate material, in alternative embodiments, such systems are also applicable for use in building 3D objects from a variety of different multi-phase materials that tend to segregate without mixing. For example, the systems may be used to build 3D objects from polymeric, multi-phase part materials such as polymeric blends of polystyrene and polyester.

Support Materials

In some embodiments, the additive manufacturing systems of the present disclosure may also be configured to deposit support materials for the chocolate confections (e.g., with additional print heads). In particular, the supporting layers or structures are typically built underneath overhanging portions or in cavities of the shapes being built, which are not supported by the chocolate part material itself. A support structure may be built utilizing the same deposition techniques by which the chocolate part material is deposited. The host computer generates additional geometry acting as a support structure for the overhanging or free-space segments of the shape being formed. Support material may then be deposited from a second print head pursuant to the generated geometry during the build process. The support material adheres to the chocolate part material during fabrication, and is removable from the completed confection when the build process is complete.

One example of a suitable support material for use with the chocolate part materials includes palm kernel oil, which is chemically compatible with chocolate, edible, and has a melting temperature lower than chocolate. The palm kernel oil desirably has a high melting temperature (i.e., a harder palm kernel oil) to reduce surface interactions with the chocolate material, which can otherwise result in a matte finish in the chocolate surface.

However, as discussed above, in some embodiments, the platen of the fused deposition modeling system may be moved in multiple degrees of freedom (e.g., five or more degrees of freedom). For example, the platen 320 may be moved in any direction along the x-axis, y-axis, z-axis, as well as being rotated around x-axis and the y-axis. This allows the platen to orient the confections such that the layers are always being built upward along the vertical z-axis. This may reduce or eliminate the need for support materials.

Although the present disclosure has been described with reference to several embodiments, workers skilled in the art will recognize that changes may be made in form and detail without departing from the spirit and scope of the disclosure.

The invention claimed is:

1. A method for printing a chocolate confection, the method comprising:
   installing a cartridge to a print head of an additive manufacturing system, wherein the cartridge comprises a compressible reservoir containing a supply of a chocolate material;
   heating the supply of the chocolate material in the installed cartridge to an extrudable state;
   compressing the compressible reservoir in a direction along a vertical axis to extrude the heated chocolate material from the installed cartridge onto a platen of the additive manufacturing system to build at least a portion of the chocolate confection using a layer-based, additive manufacturing technique, wherein all supplied amounts of the chocolate material in the cartridge are extruded from the cartridge prior to the chocolate material thickening past a viscosity threshold of the chocolate material.

2. The method of claim 1, wherein heating the supply of the chocolate material in the cartridge comprises directing heated air to the cartridge.

3. The method of claim 1, wherein cartridge further comprises a pair of thermally-conductive plates, and wherein the compressible reservoir comprises a compressible tube disposed between the thermally-conductive plates.

4. The method of claim 3, wherein heating the supply of the chocolate material in the cartridge comprises heating the thermally conductive plates to heat the compressible tube.

5. The method of claim 1, wherein the compressible reservoir comprises a compressible bellows reservoir.

6. The method of claim 1, wherein all of the supplied amounts of the chocolate material from the cartridge are extruded by about 50 minutes or less from heating the supply of the chocolate material in the cartridge to the extrudable state.

7. The method of claim 1, and further comprising:
   removing the installed cartridge from the print head after all of the supplied amounts of the chocolate material are extruded from the cartridge; and
   installing a second cartridge to the print head, wherein the second cartridge contains a second supply of the chocolate material.

8. The method of claim 1, and further comprising moving the platen in at least five degrees of freedom while extruding the heated chocolate material from the cartridge.

9. A method for printing a chocolate confection, the method comprising:
   installing a cartridge to a print head of an additive manufacturing system, wherein the cartridge comprises a compressible reservoir containing a wrapped portion of a chocolate material, the wrapped portion having an aperture in one end;
   heating the wrapped portion of the chocolate material in the installed cartridge to an extrudable state; and
   compressing the compressible reservoir in a direction along a vertical axis to extrude the tempered chocolate material from the wrapped portion onto a platen of the additive manufacturing system to build at least a portion of the chocolate confection using a layer-based, additive manufacturing technique, wherein all supplied amounts of the chocolate material in the cartridge is extruded from the wrapper and cartridge prior to the chocolate material thickening past a viscosity threshold of the chocolate material.

10. The method of claim 9, wherein the wrapped portion of a chocolate material comprises a commercially-available chocolate candy bar retained its wrapper.

11. The method of claim 9, wherein the aperture in the wrapped portion of a chocolate material comprises a slit.

12. The method of claim 9, wherein the cartridge further comprises a pair of thermally-conductive plates, and wherein the wrapped portion of the chocolate material is compressible between the thermally-conductive plates.

13. The method of claim 9, and further comprising:
   removing the cartridge after the wrapped portion of the chocolate material has been extruded; and installing a second cartridge to the print head, wherein the second cartridge contains a second supply of the chocolate material.

14. A method for printing a chocolate confection, the method comprising:
- installing a removable cartridge to a print head of an additive manufacturing system, wherein the cartridge comprises a compressible tube and an extrusion tip secured to the compressible tube and the compressible tube containing a supply of a chocolate material;
- heating the supply of the chocolate material in the compressible tube to an extrudable state;
- extruding the tempered chocolate material from the compressible tube onto a platen of the additive manufacturing system to build at least a portion of the chocolate confection using a layer-based, additive manufacturing technique, wherein all supplied amounts of the chocolate material in the compressible tube is extruded from the tube prior to the chocolate material thickening past a viscosity threshold of the chocolate material.

15. The method of claim 14, wherein heating the supply of the chocolate material in the tube comprises directing heated air to the cartridge.

16. The method of claim 14, wherein the cartridge further comprises a pair of thermally-conductive plates, and wherein the compressible tube is disposed between the thermally-conductive plates.

17. The method of claim 14, wherein all of the supplied amounts of the chocolate material from the tube are extruded by about 50 minutes or less from heating the supply of the chocolate material in the cartridge to the extrudable state.

* * * * *